United States Patent [19]

Nazareth

[11] Patent Number: 5,502,102
[45] Date of Patent: Mar. 26, 1996

[54] EPOXY MODIFIED BLENDS OF POLY(ARYLENESULFIDE) AND POLYETHERIMIDE RESINS

[75] Inventor: Darryl Nazareth, Evansville, Ind.

[73] Assignee: General Electric Company, Pittsfield, Mass.

[21] Appl. No.: 287,974

[22] Filed: Aug. 9, 1994

[51] Int. Cl.⁶ .............................. C08F 8/39; C08F 283/04
[52] U.S. Cl. .................. 524/494; 524/538; 525/180; 525/182; 525/423; 525/430; 525/436
[58] Field of Search ................................ 525/423, 535, 525/537, 180, 182, 423, 430, 436; 524/494, 538

[56] References Cited

U.S. PATENT DOCUMENTS

| | | |
|---|---|---|
| 4,455,410 | 6/1984 | Giles, Jr. . |
| 4,528,346 | 7/1985 | Sugie et al. . |
| 4,929,665 | 5/1990 | Inoue et al. ............................ 524/500 |
| 4,960,841 | 10/1990 | Kawabata et al. ...................... 525/537 |

*Primary Examiner*—George F. Lesmes
*Assistant Examiner*—Helen F. Lee

[57] ABSTRACT

A thermoplastic resin composition is provided which contains polyetherimide resin, poly(arylene sulfide) resin, an epoxy compound and, optionally, glass fibers. The composition exhibits enhanced physical properties, specifically enhanced ductility and flash resistance. The composition is useful for making molded articles exhibiting desired physical properties.

11 Claims, No Drawings

EPOXY MODIFIED BLENDS OF POLY(ARYLENESULFIDE) AND POLYETHERIMIDE RESINS

BACKGROUND OF THE INVENTION

1. Field of the Invention

The present invention relates to polyetherimide/poly(arylene sulfide) blends compatibilized with an epoxy compound, and more particularly relates to reinforced polyetherimide/poly(arylene sulfide) compatibilized blends.

2. Description of the Related Art

Compositions comprising blends of poly(phenylene sulfide) and polyetherimdes have been disclosed in U.S. Pat. No. 4,455,410 (Giles).

Compositions comprising a poly(arylene sulfide) resins, an epoxy compound, and optionally another thermoplastic resin, a reinforcing material, a filler and/or a fire retardant have been disclosed in U.S. Pat. No. 4,528,346 (Sugie). This patent further lists numerous possible other thermoplastic resins, and specifically sets out polyesters, polyamides, polyarylates, polycarbonates, poly(phenylene oxide)s, polyimides, polyketone imides, polyamideimides, poly(ether ether ketone)s, polysulfones and elastomers, and sets out in Table 4, Examples 44 and 45 compositions containing poly(phenylene sulfide), polyamideimide and an epoxy compound.

Compositions comprising glass reinforced poly(arylene sulfide) resins and polyetherimide which additionally contain at least one polyolefin in an amount to substantially improve the heat distortion temperature of the composition have been disclosed in commonly owned application Ser. No. 08/028,061 (Glaser et al) filed Mar. 8, 1993, now U.S. Pat. No. 5,430,102.

Glass filled poly(arylene sulfide)/polyetherimide blend compositions exhibit numerous desirable properties, but there has been a need to enhance various properties, including, for example, the flash resistance and ductility of the compositions.

It is an object of the present invention to provide glass filled poly(arylene sulfide)/polyetherimide blend compositions which exhibit enhanced physical properties, for example, exhibiting enhanced ductility and morphological stability, while substantially retaining other key properties such as heat distortion temperature.

SUMMARY OF THE INVENTION

The present invention provides a thermoplastic resin composition comprising a polyetherimide resin (hereafter referred to as "PEI"), a poly(arylene sulfide) resin (hereafter referred to as "PPS"), and an epoxy compound. The compositions may further comprise at least one reinforcing filler, for example, glass fibers. The compositions are useful in preparing no-flash high heat molded parts such as electrical connectors.

DETAILED DESCRIPTION OF THE INVENTION

The thermoplastic resin composition comprises (a) a PEI, (b) a PPS, (c) an epoxy compound, and, optionally, (d) reinforcing fillers, preferably glass fibers.

The PEI used for preparing the blends of this invention contain repeat units in excess of 1 and typically from 10 to 1000 or more of the formula (I):

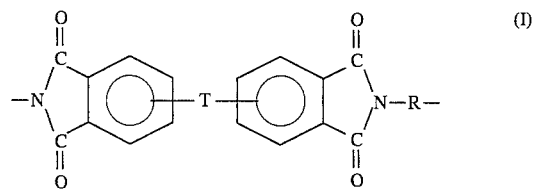

wherein T is —O— or a group of the formula —O—Z—O— wherein the divalent bonds of the —O— or the —O—Z—O— group are in the 3,3', 3,4', 4,3', or the 4,4' positions; Z is a divalent radical selected from the group consisting of formulae (II):

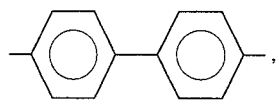

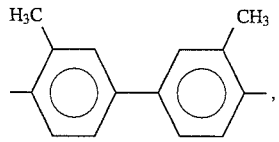

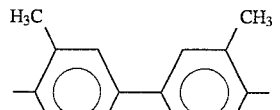

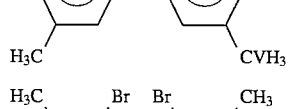

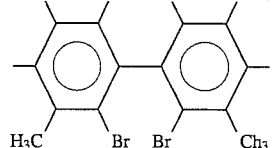

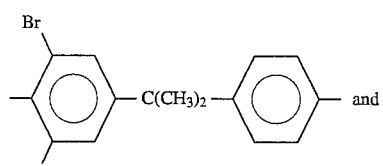

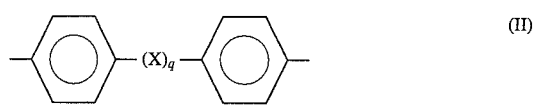

wherein X is a member selected from the group consisting of divalent radicals of the formulae (III):

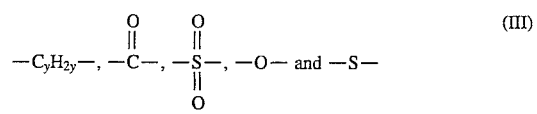

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

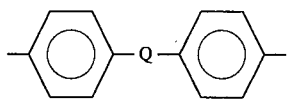

where Q is a member selected from the group consisting of formulae (V):

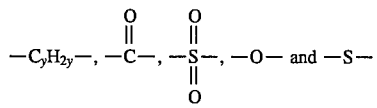

where y is an integer from about 1 to about 5.

In one embodiment, the polyetherimide may be a copolymer which, in addition to the etherimide units described above, further contains polyimide repeating units of the formula (VI)

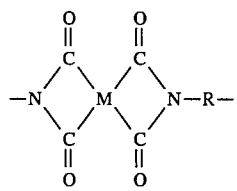

wherein R is as previously defined and M is selected from the group consisting of formula (VII):

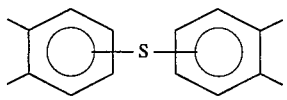

and formula (VIII):

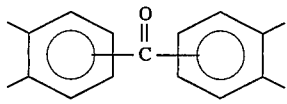

These polyetherimide copolymers and their preparation are described in U.S. Pat. No. 3,983,093 (Williams et al), which is incorporated herein by reference.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (IX) include:

2,2-bis(4-(3,4-dicarboxyphenoxy)pheny)propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis([4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-diacarboxyphenoxy)benzophenone dianhydride;
4,4'-bis(2,3-dicarboxyphenoxy)diphenyl sulfone dianhydride;
4-(2,3-dicarboxyphenoxy)-4'-3,4-dicarboxyphenoxy)diphenyl-2,2-propane dianhydride;
4-(2,3-dicarboxyphenoxy)-4'-(3,4-dicarboxyphenoxy)diphenyl ether dianhydride;
4-(2,3-dicarboxyphenoxy)-4'-(3,4-dicarboxyphenoxy)diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy)diphenyl sulfone dianhydride, and various mixtures thereof.

A preferred class of aromatic bis(ether anhydride)s included by formula (IX) above includes compounds wherein T is of the formula (XI):

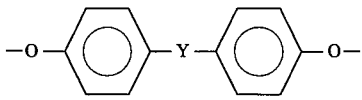

and the ether linkages are in the 3,3', 3,4', 4,3', or the 4,4' positions, and mixtures thereof, and where Y is selected from the group consisting of formulae (XII):

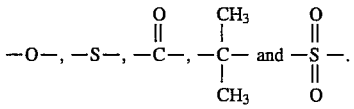

When PEI/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitrosubstituted phenyl dinitrile with a metal salt of dihydric phenol compound in the presence of a dipolar, aprotic solvent.

Additional aromatic bis(ether anhydride)s also included by formula (I) above are shown by Koton, M. M., Florinski, F. S., Bessonov, M. I. and Rudakov, A. P. (Institute of Heteroorganic Compounds, Academy of Sciences, U.S.S.R), U.S.S.R. patent 257,010, Nov. 11, 1969, Appl. May 3, 1967, and by M. M. Koton, F. S. Florinski, Zh. Org. Khin. 4(5), 774 (1968).

The organic diamines of formula (X) include, for example:

m-phenylenediamine;
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-diamethylbenzidine;
3,3-dimethoxybenzidine;
2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane;
benzidine;

m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1–4,cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine; and
mixtures of such diamines.

The polyetherimides can be prepared by any of the methods well known to those skilled in the art, including the reaction of an aromatic bis(ether anhydride) of the formula (IX):

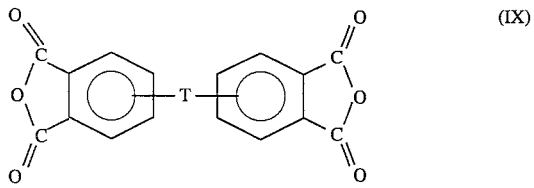

with an organic diamine of the formula (X):

(X) H$_2$N—R—NH$_2$ wherein T and R are defined as described above.

In general, the polyetherimide-forming reactions can be advantageously carried out using well-known solvents, e.g., o-dichlorobenzene, m-cresol/toluene, and the like, in which to effect interaction between the dianhydrides and the diamines, at temperatures of from about 100° C. to about 250° C. Alternatively, the polyetherimides can be prepared by melt polymerization of any of the above dianhydrides with any of the above diamine compounds while heating the mixture of ingredients at elevated temperatures with concurrent intermixing. Generally, melt polymerization temperatures between about 200° C. to 400° C., and preferably 230° C. to 300° C. can be used. The conditions of the reaction and the proportions of ingredients can be varied widely depending on the desired molecular weight, intrinsic viscosity, and solvent resistance. In general, equimolar amounts of diamine and dianhydride are used for high molecular weight polyetherimides, however, in certain instances, a slight molar excess (about 15 mol percent) of diamine can be used resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

The PPS used in the present invention are derived from the known polymers containing arylene groups separated by sulfur atoms. They include poly(phenylene sulfide)s, for example poly(p-phenylene sulfide) and substituted poly(phenylene sulfide)s. Typical PPS polymers comprise at least 70 molar %, preferably at least 90 molar %, of recurring units of the following structural formula (XIII):

Typically, when the amount of said recurring units of formula (XIII) is less than 70 molar %, the heat resistance is insufficient.

The remaining 30 molar % or less, preferably 10 molar % or less, of the recurring units of PPS can be those of the following structural formulae (XIV):

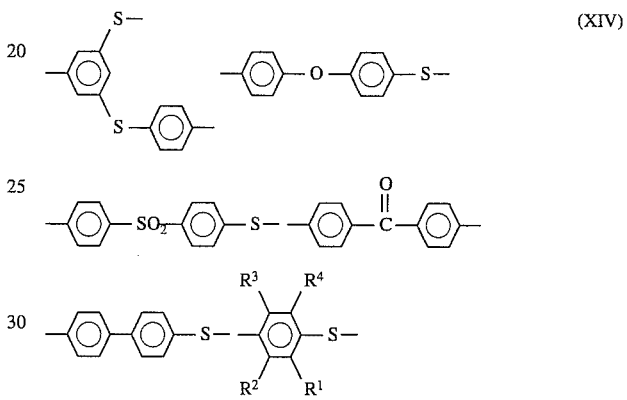

wherein, R$^1$, R$^2$, R$^3$, R$^4$ can be independently selected from the group consisting of hydrogen, halogen, alkyl, phenyl, alkoxy, nitro, amino and carboxy groups.

The PPS of the present invention may be a linear, branched or cured polymer or mixtures of the same. Linear PPS polymer of relatively low molecular weight may be prepared by, for example, a process disclosed in U.S. Pat. No. 3,354,129 which is incorporated herein by reference. Linear PPS polymers having a relatively high molecular weight may be prepared by, for example, the process disclosed in U.S. Pat. No. 3,919,177 which is incorporated herein by reference. Branched PPS resins may be prepared by the use of a branching agent, for example 1,3,5-trichlorobenzene, which is disclosed in U.S. Pat. No. 4,749,163, which is incorporated herein by reference. The degree of polymerization of the polymers prepared by the processes of U.S. Pat. Nos. 3,354,129, 3,919,177 and 4,749,163 can be further increased by curing with heating the same in an oxygen atmosphere or in the presence of a crosslinking agent such as a peroxide after polymerization.

The PPS may be functionalized or unfunctionalized. If the PPS is functionalized, the functional groups may include, but are not limited to, amino, carboxylic acid, metal carboxylate, disulfide, thio and metal thiolate groups. One method for incorporation of functional groups into PPS can be found in U.S. Pat. No. 4,769,424, incorporated herein by reference, which discloses incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronaphthalene.

Though the melt viscosity of PPS used in the present invention is not particularly limited so far as the moldings which can be obtained, a melt viscosity of at least 100 Poise is preferred from the viewpoint of the toughness of PPS per se and that of 10,000 Poise or less is preferred from the viewpoint of the moldability.

The PPS in this invention may also be treated to remove contaminating ions by immersing the resin in aleionized water or by treatment with an acid, typically hydrochloric acid, sulfuric acid, phosphoric acid or acetic acid as found in Japanese Kokai Nos. 3236930-A, 1774562-A, 12299872-A and 3236931-A, incorporated herein by reference. For some product applications, it is preferred to have a very low impurity level in the PPS, represented as the percent by weight ash remaining after burning a sample of the PPS. Typically ash contents of the PPS of less than about 1% by weight are desirable with ash numbers less than about 0.5% by weight preferred and ash numbers less than about 0.1% by weight most preferred.

The epoxy compound is a liquid or solid epoxy compound usually containing, on average, at least two epoxy groups. Epoxy compounds having a molecular weight of 100 to 10,000 are preferred. Examples of the epoxy compound used in this invention include glycidyl ethers of bisphenols such as bisphenol A, resorcinol, hydroquinone, pyrocatechol, bisphenol F, tetrabromobisphenol A, tetraphenylolethane, phenol novolaks, o-cresol novolaks, polypropylene glycol, hydrogenated bisphenol A, saligenin, 1,3,5-trihydroxybenzene, trihydroxydiphenyldimethylmethane, 4,4'-dihydroxybiphenyl, 1,5-dihydroxynaphthalene, cashew phenol, dihydroxydiphenylsulfone and 2,2,5,5,-tetrakis(4-hydroxyphenyl)hexane; glycidyl ethers of halogenated bisphenols, glycidyl ethers such as a diglycidyl ether of butanediol; glycidyl esters such as glycidyl phthalate, glycidylamines such as N-glycidylaniline; linear non-glycidyl epoxy resins such as epoxidized polyolefins and epoxidized soybean oils; cyclic non-glycidyl epoxy resins such as vinyl cyclohexane dioxide and dicyclopentadiene dioxide; glycidyl esters of hexahydrophthalic anhydride, dimer acids; glycidyl amine epoxy resins derived from diaminodiphenylmethane, isocyanuric acid, hydantoin; mixed glycidyl epoxy resins derived from p-aminophenol, p-oxybenzoic acid; salicyclic epoxy resins and novolak phenol-type resins.

These epoxy compounds may be used singly or as a mixture of two or more. The novolak phenol-type epoxy resins are especially preferred. The novolak phenol-type epoxy resins usually are obtained by reacting novolak-type phenolic resins with epichlorohydrin. Preferred novolak phenol resins are those obtained by the condensation reaction of phenols and formaldehyde as schematically illustrated by formula (XV):

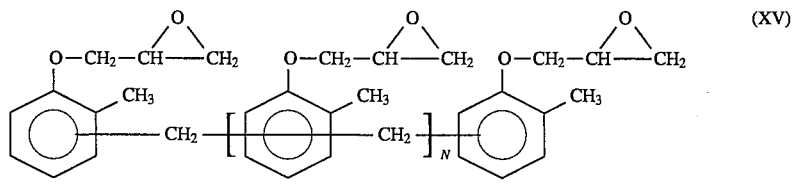

wherein N is 0 or more and typically from 0 to about 5.

The epoxy cresol novolaks are available from Ciba-Geigy as ECN 1235 (average value for N=0.7), ECN 1273 (average value for N=2.8) and ECN 1299 (average value for N=3.4).

There is no particular restriction on the starting phenols, but suitable phenols include phenol, o-cresol, m-cresol, p-cresol, bisphenol A, resorcinol, p-tertiary butyl phenol, bisphenol F, bisphenol S, and mixtures of these.

Epoxy functional elastomers are also useful as the epoxy compound for the present invention. These olefinic compounds are copolymers of an α-olefin with a glycidyl ester of an α, β-unsaturated carboxylic acid. α-Olefin as used herein means ethylene, propylene, butene-1, etc. Among them, ethylene is preferred. The glycidyl esters of the α, β-unsaturated acids are compounds of the general formula (XVI):

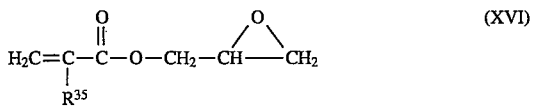

wherein $R^{35}$ represents a hydrogen atom or a lower alkyl group. Examples of the glycidyl esters of α, β-unsaturated acids include glycidyl acrylate, glycidyl methacrylate and glycidyl ethacrylate. The epoxy functional olefinic elastomer is preferably an olefinic copolymer containing of from about 60% to about 99.5% by weight of an α-olefin and of from about 0.5% to about 40% by weight of a glycidyl ester of an α, β-unsaturated carboxylic acid, preferably of from about 3% to about 30% by weight; based on the weight of the elastomer's composition. When this amount is less than about 0.5% by weight, no intended effects can be obtained and when it exceeds about 40% by weight, gelation occurs during melt-blending with PPS resulting in degradation of the extrusion stability, moldability and mechanical properties of the product. Suitable epoxy functional α-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are Igetabond® from Sumitomo, Bondfast® E from Sumitomo and Lotader® AX from Elf Atochem.

By adding an epoxy compound to the PEI/PPS compositions, optionally in combination with a reinforcing filler, it was surprisingly discovered that the resulting compositions had a unique combination of beneficial properties including high temperature resistance, excellent dimensional stability, flow and chemical resistance. One of the most surprising discoveries was that by combining the above components in the appropriate amounts, it was possible to create a resin composition with no flash capabilities. The term "no flash" resin composition is intended to include not only those compositions which exhibit no flash, but also those compositions which exhibit substantially no flash characteristics.

Thus, according to one embodiment of the invention, the epoxy compound is added in an amount sufficient to provide a thermoplastic resin composition which exhibits no flash capabilities.

Suitable reinforcing fillers are those which increase the rigidity of the blend. Amongst these, fibrous materials are preferred, in particular glass fibers made from low alkali E-glass, having a fiber diameter of from 8 to 14 μm, the length of the glass fibers in the finished injection molding being from 0.01 mm to 0.5 mm. The glass fibers may be employed as rovings or as chopped or milled glass fibers, and may be provided with a suitable finish and an adhesion promoter or promoter system based on silanes. The amount of the reinforcing filler is generally an amount sufficient to increase the rigidity of the composition. The amount of reinforcing fillers is advantageously from about 5% to about 60% by weight, especially from about 10% to about 40% by weight; all based on the total weight of the composition.

However, other fibrous reinforcing materials, e.g. carbon fibers and microfibers, potassium titanate single-crystal fibers, gypsum fibers, aluminum oxide fibers or asbestos may also be incorporated. Non-fibrous fillers, e.g. glass beads, hollow glass beads, chalks, micas, talcs, quartzes and natural or calcined kaolins are further preferred fillers, as are combinations of these materials with glass fibers. Like the glass fibers, these latter fillers may be provided with a finish and/or an adhesion promoter or adhesion promoter system.

The amount of the PEI combined with the PPS is generally an amount sufficient to improve the dimensional stability of the PPS. The amount of the epoxy utilized with the PEI and PPS is generally an amount sufficient to improve the compatibility of the overall composition. The compositions of the present invention advantageously comprise, represented as percentages by weight of the total composition, (a) a PEI preferably present at a level of from about 4% to about 44% by weight, more preferably present at a level of from about 5% to about 35% by weight thereof, and most preferably present at a level of from about 13% to about 15% by weight thereof; (b) a PPS present at a level of from about 35% to about 90% by weight, more preferably present at a level of about 40% to about 45% by weight thereof, most preferably present at a level of from about 46% to about 50% by weight thereof; and (c) an epoxy compound preferably present at a level of from about 0.05% to about 20% by weight, more preferably present at a level of from about 1% to about 12% by weight, most preferably present at a level of from about 2% to about 8% by weight. The compositions of the present invention may further comprise, represented as a percentage by weight based on the total weight of the composition, component (d) a reinforcing filler, preferably glass fiber, preferably present at a level of from 0% to about 60% by weight, more preferably present at a level of from about 10% to about 45% by weight, and most preferably present at a level of from about 25% to about 45% by weight.

The PPS and PEI are preferably present in the composition at a respective weight ratio between about 20:1 and about 1.2:1, more preferably between about 8:1 and about 2:1, most preferably between about 6:1 and about 3:1.

The preparation of the compositions of the present invention is normally achieved by intimately admixing the ingredients under conditions for the formation of an intimate blend. Such conditions often include mixing in single or twin screw type extruders or similar mixing devices which can apply a shear to the components.

All of the ingredients may be added initially to the processing system, or else certain additives may be precompounded with each other or with one of the primary polymer components, PEI and PPS. While separate extruders may be used in the processing, these compositions may also be prepared by using a single extruder having multiple feed ports along its length to accommodate the addition of the various components. It is often advantageous to add the glass fiber into a port near the end of the extruder in order to minimize the fiber breakage from overcompounding in the extruder. It is also sometimes advantageous to employ at least one vent port in each section between the feed ports to allow venting (either atmospheric or vacuum) of the melt. Those of ordinary skill in the art will be able to adjust blending times and temperatures, as well as component addition, without undue experimentation.

It should also be clear that improved molded articles prepared from the compositions of the present invention represent an additional embodiment of this invention.

The composition of this invention may further contain other fillers, stabilizers, plasticizers, flexibilizers, surfactant agents, pigments, dyes, reinforcements, flame retardants, and diluents in conventional amounts.

The following examples are provided to illustrate some embodiments of the present invention. They are not intended to limit the invention in any aspect. All percentages are by weight based on the total weight of the entire composition, unless otherwise indicated.

The thermoplastic compositions may be molded into articles which exhibit desired levels of toughness, chemical resistance and flash resistance. Specifically, the thermoplastic compositions are useful in making automotive parts for under the hood applications, needing both solvent resistance and high heat distortion temperatures.

All patents and references cited herein are incorporated by reference.

Examples

Blends were compounded on a 30 mm twin screw extruder at 350 rpm. All raw materials were dry blended and charged to the feed throat. The extruder barrel set temperature was set to approximately 300° C. (572° F.). Dried, pelletized blended material was then injection molded, also at 300° C. into standard test pieces for measurement of Izod impact strength according to ASTM D256 (employing a sample size of 2.5 inch by 0.5 inch by 0.125 inch), Dynatup (energy to fracture falling dart test) strength according to ASTM D3763 (using 4 inch diameter by 0.125 inch disks), flexural modulus and flexural strength according to ASTM D790 (employing a samples size of 6 inch by 0.5 inch by 0.25 inch), heat deflection under a load of 264 psi according to ASTM D648 (employing a sample size of 6 inch by 0.5 inch by 0.25 inch) and tensile yield and tensile elongation at break according to ASTM D638. The viscosities were measured under the described conditions using an Instron capillary rheometer at 300° C., 5 kg of weight.

The polyetherimide resin (PEI) was Ultem 1040 obtained from General Electric Company. The poly(arylene sulfide) resin (PPS) was a poly(p-phenylene sulfide) resin grade PPS B214 obtained from Tosoh Susteel. The epoxy compound was an epoxy cresol novolak resin designated as ECN1299 obtained from Ciba Geigy. The glass fibers were E glass fibers obtained from Owens-Corning as OCF 497EE. The polyamideimide (PAI) was Torlon™ 4203 from Amoco Company and comprises repeating units of the following formula (XVII):

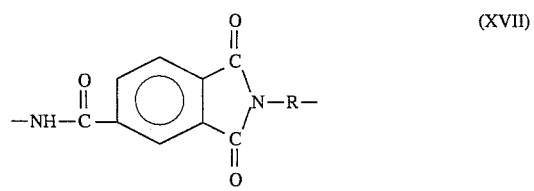

wherein R is formula (XVII):

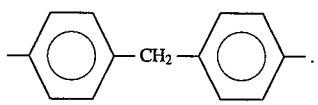 (XVI)

TABLE 1

| Formulations: | 1 | 2 | 3 | 4 | 5 | 6 | 7 | 8 |
|---|---|---|---|---|---|---|---|---|
| PPS B214 | 70 | 70 | 70 | 70 | 50 | 52 | 50 | 50 |
| PEI | 30 | 28 | 0 | 0 | 20 | 16 | 0 | 0 |
| PAI | 0 | 0 | 30 | 28 | 0 | 0 | 20 | 20 |
| ECN 1299 | 0 | 2 | 0 | 2 | 0 | 2 | 0 | 2 |
| OCF497 EE | 0 | 0 | 0 | 0 | 30 | 30 | 30 | 30 |
| Properties: | | | | | | | | |
| Flammability @1/32", UL94 | V-0 | V-0 | V-0 | V-0 | V-0 | V-0 | V-0 | V-0 |
| HDT @ 264 psi, 1/4", C | 135 | 118 | 155 | 157 | 217 | 213 | 251 | 250 |
| Unnotch Izod Impact, ft-lb/in | 6.8 | 8.4 | 6.6 | 6.3 | — | — | — | — |
| Notch Izod Impact, ft-lb/in | 0.2 | 0.2 | 0.2 | 0.2 | 1.3 | 1.5 | 1.0 | 1.1 |
| Tensile Elongation, % | 2.0 | 3.0 | 2.0 | 2.1 | 1.2 | 1.5 | 1.0 | 1.1 |
| Tensile Strength, psi | 9550 | 12100 | 8100 | 7900 | 18000 | 20700 | 16000 | 16200 |
| Flex Modulus, kpsi | 600 | 603 | 600 | 600 | 1530 | 1540 | 1530 | 1520 |
| Flex Strength, psi | 22900 | 22400 | 21000 | 21300 | 28700 | 28700 | 28700 | 28000 |

As noted by the data in Table 1, compositions comprising the PEI and PPS (samples 1 and 2) show a surprising improvement in unnotched Izod impact and tensile strengths with the addition of the epoxy compound. This improvement is in marked contrast to the corresponding data for the PAI/PPS compositions (samples 3 and 4) of the prior art. Samples 5 and 6 illustrate the similar surprising enhancement in tensile strength with the addition of the epoxy compound to glass reinforced PEI/PPS compositions.

We claim:

1. A composition consisting essentially of:
   a) a polyetherimide resin present at a level of from about 5% to about 35% by weight based on the total weight of the composition;
   (b) a poly(p-phenylene sulfide) resin present at a level of from about 40% to about 55% by weight based on the total weight of the composition; and
   (c) an epoxy compound present at a level of from about 1% to about 12% by weight based on the total weight of the composition, wherein the epoxy compound is an epoxy cresol novolak resin; wherein the weight ratio of poly(arylene sulfide) resin to polyetherimide is between 8:1 and 2:1.

2. The composition of claim 1 wherein said epoxy compound consists essentially of units of the formula

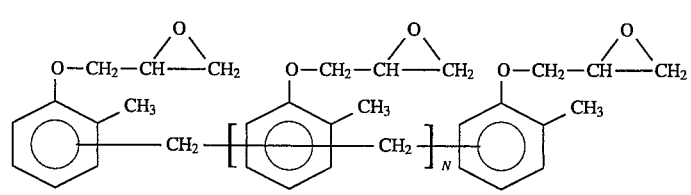

wherein N is 0 or greater.

3. The compostion of claim 2 further consisting essentially of a reinforcing filler present at a level of from about 5% to about 60% by weight based on the total weight of the composition.

4. The composition of claim 3 wherein the reinforcing filler consists essentially of glass fibers.

5. The composition of claim 1 wherein said polyetherimide consists essentially of repeating units of the formula:

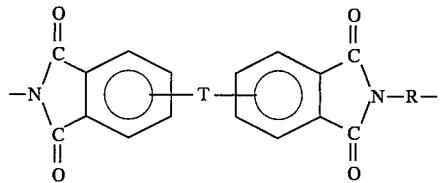

wherein T is —O— or a group of the formula —O—Z—O— wherein the divalent bonds of the —O— or the —O—Z—O— group are in the 3,3', 3,4', 4,3', or the 4,4' positions; Z is a divalent radical selected from the group consisting of formulae:

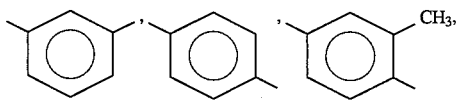

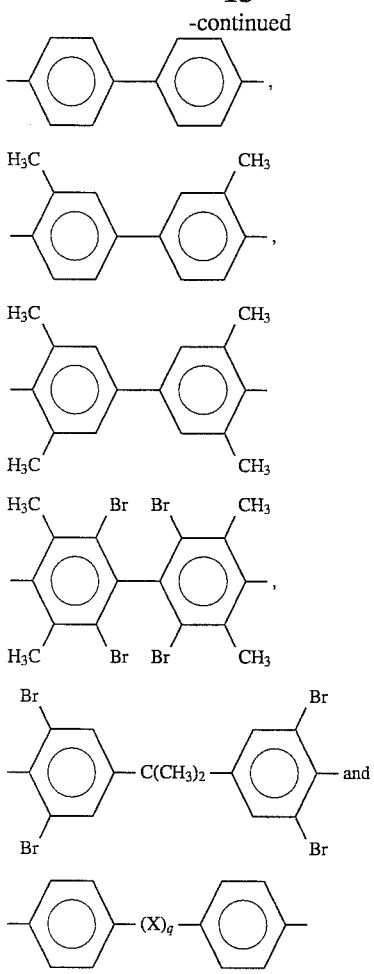

wherein X is a member selected from the group consisting of divalent radicals of the formulae:

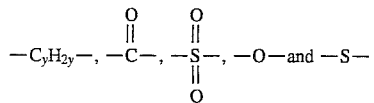

wherein y is an integer from 1 to about 5, and q is 0 or 1;

R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula:

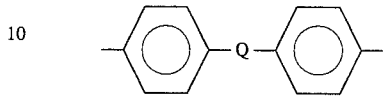

where Q is a member selected from the group consisting of formulae:

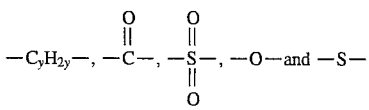

where y is an integer from about 1 to about 5.

6. The composition of claim 5 further consisting essentially of glass fiber being present at a level of from about 10% to about 45% by weight based on the total weight of the composition.

7. The composition of claim 1 wherein the weight ratio of poly(p-phenylene sulfide) resin to polyetherimide is between 6:1 and 3:1, respectively.

8. The composition of claim 1 wherein the epoxy compound is present in amount sufficient to create a resin composition with no flash capabilities.

9. An article molded from the composition of claim 1.

10. A method for making the composition of claim 1 comprising the steps of:

intimately admixing the polyetherimide resin, the poly(p-phenylene sulfide) resin, and the epoxy compound.

11. The composition of claim 1 further consisting essentially of at least one member selected from the group consisting of fillers, stabilizers, plasticizers, flexibilizers, surfactant agents, pigments, dyes, reinforcements, flame retardants, and diluents.

* * * * *